(12) United States Patent
Liu et al.

(10) Patent No.: US 10,747,040 B2
(45) Date of Patent: Aug. 18, 2020

(54) SUBSTRATE FOR TOUCH SENSOR

(71) Applicant: 3M INNOVATIVE PROPERTIES COMPANY, St. Paul, MN (US)

(72) Inventors: Richard Y. Liu, Woodbury, MN (US); Derek W. Patzman, Savage, MN (US); Stephen A. Johnson, Woodbury, MN (US)

(73) Assignee: 3M Innovation Properties Company, St. Paul, MN (US)

(*) Notice: Subject to any disclaimer, the term of this patent is extended or adjusted under 35 U.S.C. 154(b) by 0 days.

(21) Appl. No.: 16/099,600

(22) PCT Filed: May 15, 2017

(86) PCT No.: PCT/US2017/032664
§ 371 (c)(1),
(2) Date: Nov. 7, 2018

(87) PCT Pub. No.: WO2017/205097
PCT Pub. Date: Nov. 30, 2017

(65) Prior Publication Data
US 2019/0129218 A1    May 2, 2019

Related U.S. Application Data (60) Provisional application No. 62/341,182, filed on May 25, 2016, provisional application No. 62/467,410, filed on Mar. 6, 2017.

(51) Int. Cl.
*G02F 1/1333* (2006.01)
*B32B 27/08* (2006.01)
(Continued)

(52) U.S. Cl.
CPC ............ *G02F 1/13338* (2013.01); *B32B 7/02* (2013.01); *B32B 27/08* (2013.01); *B32B 27/36* (2013.01);
(Continued)

(58) Field of Classification Search
CPC ..... G02F 1/13338; G02F 1/1343; B32B 7/02; B32B 27/08; B32B 27/36; G06F 3/041; G06F 3/0412
See application file for complete search history.

(56) References Cited

U.S. PATENT DOCUMENTS 6,130,013 A * 10/2000 King ................. G03F 7/091
                                                    430/14
6,641,900 B2 * 11/2003 Hebrink ............... G02B 5/3083
                                                    428/212
(Continued)

OTHER PUBLICATIONS

Liu, "Comparison of Statistical and Blocky Copolymers of Ethylene Terephthalate and Ethylene 4,4'-Bibenzoate Based on Thermal Behavior and Oxygen Transport Properties", Journal of Polymer Science Part B: Polymer Physics, 2003, vol. 41, pp. 289-307.
(Continued)

*Primary Examiner* — Ariel A Balaoing
(74) *Attorney, Agent, or Firm* — Clifton F. Richardson (57) ABSTRACT

Substrates suitable for use in a touch sensor are described. In some cases, the substrates include an inner layer and first and second heat-set polymeric outer layers. The first and second outer layers each have an in-plane birefringence of less than 0.1. The inner layer is substantially uniaxially birefringent and has an in-plane birefringence greater than 0.01. In some cases, a substrate includes a block copolymer which includes a first polyester and second polyester. The first polyester has a melting point greater than 200 °C., and the second polyester having a melting point less than 200° C. The block copolymer includes the second polyester at 50
(Continued)

to 80 percent by weight. The substrate is substantially uniaxially birefringent and has an in-plane birefringence between 0.001 and 0.1.

19 Claims, 4 Drawing Sheets

(51) Int. Cl.
    *B32B 27/36*     (2006.01)
    *B32B 7/02*     (2019.01)
    *G06F 3/041*     (2006.01)
    *B32B 37/15*     (2006.01)
    *G02B 5/30*     (2006.01)
    *G02F 1/1343*     (2006.01)

(52) U.S. Cl.
    CPC ............ *B32B 37/153* (2013.01); *G02B 5/305* (2013.01); *G02B 5/3083* (2013.01); *G02F 1/1343* (2013.01); *G06F 3/041* (2013.01); *G06F 3/0412* (2013.01); *G06F 2203/04103* (2013.01)

(56) References Cited

U.S. PATENT DOCUMENTS

| | | |
|---|---|---|
| 8,263,731 B2 | 9/2012 | Liu |
| 8,384,691 B2 | 2/2013 | Frey |
| 8,865,027 B2 | 10/2014 | Alden |
| 8,933,906 B2 | 1/2015 | Frey |
| 9,023,229 B2 | 5/2015 | Sebastian |
| 2001/0019182 A1 | 9/2001 | Hebrink |
| 2002/0122252 A1* | 9/2002 | Hebrink ................. B32B 27/36 359/489.15 |
| 2005/0249944 A1* | 11/2005 | Wang .................... G02B 1/105 428/339 |
| 2007/0298271 A1* | 12/2007 | Liu .......................... B32B 7/12 428/480 |
| 2010/0124667 A1 | 5/2010 | Liu |
| 2010/0149460 A1* | 6/2010 | Akao ................... G02B 5/3016 349/75 |
| 2011/0074282 A1* | 3/2011 | Bright ................ C23C 16/0272 313/504 |
| 2013/0100530 A1 | 4/2013 | Weber |
| 2013/0234966 A1 | 9/2013 | Jhuang |
| 2014/0192277 A1* | 7/2014 | Yilmaz ................. G06F 3/0412 349/12 |
| 2015/0316955 A1 | 11/2015 | Dodds |

OTHER PUBLICATIONS

International Search Report for PCT International Application No. PCT/US2017/032664, dated Aug. 8, 2017, 4 pages.

\* cited by examiner

SUBSTRATE FOR TOUCH SENSOR

BACKGROUND

Touch sensors typically include electrodes disposed on a surface of a substrate. Conventional substrates include cyclic olefin polymer (COP). However, COP is expensive and can be difficult to process.

SUMMARY

In some aspects of the present description, a substrate including first and second outer layers and a polymeric inner layer disposed between and in direct contact with the first and second outer layers is provided. Each of the first and second outer layers are heat-set polymeric layers. The inner layer has a composition differing from that of the first outer layer and differing from that of the second outer layer. Each of the first and second outer layers have an in-plane birefringence of less than 0.1 and the inner layer is substantially uniaxially birefringent and has an in-plane birefringence greater than 0.01.

In some aspects of the present description, a substrate comprising a block copolymer including a first polyester and second polyester is provided. The first polyester has a melting point greater than 200° C. and the second polyester has a melting point less than 200° C. The block copolymer includes the second polyester at 50 to 80 percent by weight. The substrate is substantially uniaxially birefringent and has an in-plane birefringence between 0.001 and 0.1.

DETAILED DESCRIPTION

In the following description, reference is made to the accompanying drawings that forms a part hereof and in which various embodiments are shown by way of illustration. The drawings are not necessarily to scale. It is to be understood that other embodiments are contemplated and may be made without departing from the scope or spirit of the present disclosure. The following detailed description, therefore, is not to be taken in a limiting sense.

A commonly used substrate in touch sensors is cyclic olefin polymer (COP). COP is often chosen due to its optical properties such as its low stress birefringence. However, COP is expensive and can be difficult to process due to its low elongation at break. According to the present description, substrates have been developed which have a low stress birefringence, are easily processed via extrusion and conventional web handling techniques, and are suitable for use in touch sensors and other applications. In some embodiments, the substrates have a controlled degree of uniform birefringence which gives substantially no visible stress birefringence when observed under crossed polarizers. In some embodiments, the substrates have an outer major surface that is optically smooth so that electrodes can be readily disposed on the surface. In some embodiments, the substrates can be made by extrusion or coextrusion followed by stretching and heat setting. In some embodiments, the substrates are made from polyesters which are significantly less expensive than COP. In some embodiments, the substrates offer substantially improved elongation at break compared to COP substrates and this can result in reduced web breaks in conventional web manufacturing processes.

Figure 1:
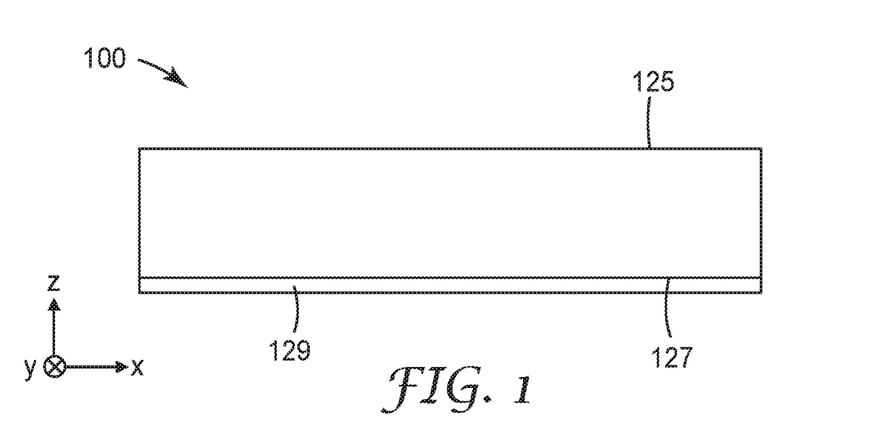
FIG. 1 is a schematic cross-sectional view of a substrate.

FIG. 1 is a schematic cross-sectional view of substrate 100. Substrate 100 includes a block copolymer comprising a first polyester and second polyester. The first polyester has a melting point greater than 200° C., or greater than 220° C., or greater than 240° C., and the second polyester has a melting point less than 200° C., or less than 190° C., or less than 180° C. The block copolymer includes the second polyester at 40 percent, or 50 percent, or 55 percent to 80 percent, or to 75 percent, or to 70 percent by weight of the block copolymer. For example, the block copolymer may include the second polyester at 40 to 80 percent by weight, or at 50 to 80 percent by weight, or at 55 to 75 percent by weight. In some embodiments, the first polyester is polyethylene terephthalate (PET) and the second polyester is glycol modified polyethylene terephthalate (PETg). In some embodiments, the first polyester is polyethylene naphthalate (PEN), and in some embodiments, the second polyester is glycol modified polyethylene naphthalate (PENg). PENg, analogous to PETg, can be made by substituting ethylene glycol subunits of PEN with alternate diol subunits, such as birefringent-reducing diol subunits (e.g., branched or cyclic C4-C10 alkyl diol subunits) as described in U.S. Pat. No. 8,263,731 (Liu et al.). In some embodiments, the PENg comprises 40 to 50 mole percent naphthalate subunits, 25 to 50 mole percent ethylene glycol subunits and 10 to 25 mole percent branched or cyclic C4-C10 alkyl diol subunits. In some embodiments, the first polyester is a first copolyester based on terephthalate and in some embodiments, the second polyester is a different second copolyester based on terephthalate. The block copolymer may include at least 20 percent, or at least 40 percent, or at least 60 percent PET by weight.

The substrate 100 is substantially uniaxially birefringent and has an in-plane birefringence greater than 0.001, or greater than 0.002, or greater than 0.005, and less than 0.1. In-plane birefringence refers to the difference between the refractive index for light polarized along a first in-plane direction along which the refractive index is highest and the refractive index for light polarized along an orthogonal second in-plane direction. For example, referring to the x-y-z coordinate system in FIG. 1, if the substrate has been oriented along the x-axis, the refractive index will be higher for light polarized along the x-axis than for light polarized along other in-plane directions and the in-plane birefringence is $n_x - n_y$, where $n_x$ is the refractive index for light polarized along the x-direction and $n_y$ is the refractive index for light polarized along the y-direction. The out-of-plane birefringence refers to the difference between the average of the refractive index along the first and second in-plane directions and the refractive index along the out-of-plane direction. Referring to the coordinate system of FIG. 1, the out-of-plane birefringence is given by $(n_x + n_y)/2 - n_z$ where $n_z$ is the refractive index along the z-direction. In some embodiments, the substrate 100 has an out-of-plane birefringence of greater than 0.01, or greater than 0.03, or greater than 0.05 and less than 0.2, or less than 0.15, or less than 0.1. Unless specified otherwise, refractive index refers to the index of refraction measured at a wavelength of 633 nm. The refractive index can be measured, for example, using a prism coupler such as the Metricon Model 2010/M prism coupler available from Metricon Corporation (Pennington, N.J.). The refractive index and birefringence values for a layer in a multilayer stack can be determined from refractive index measurements on a single layer where the single layer has the same composition as the layer in the multilayer stack and has the same degree of orientation (e.g., stretched through the same draw ratio). The substrate 100 has an outermost first major surface 125 and an opposing major surface 127. The first major surface 125 may be optically smooth. That is, any surface roughness present may have a peak to valley height small compared to a wavelength of visible light (e.g., small compared to 550 nm). In some embodiments, the first major surface 125 may have a surface roughness Ra of less than 100 nm, or less than 50 nm, or less than 20 nm, or even less than 10 nm. Ra refers to an arithmetic average of absolute values of differences between a surface height and an average surface position. Ra may be determined according to the American Society of Mechanical Engineers (ASME) B46.1-2009 test standard.

As is known in the art, slip coatings can be applied to a film in order to aid in forming a roll of the film. An optional slip coating 129 may be disposed on the second major surface 127 of that the substrate 100. In some embodiments, a roll of the substrate 100 is provided.

Block copolymers refer to polymeric materials in which chemically different blocks or sequences bind each other in macromolecular chains. Block copolymers can be linear block copolymers or branched block copolymers. Examples of linear block copolymers include diblock ((A-B) structure), triblock ((A-B-A) structure), and multiblock (-(A-B)$_n$-structure) copolymers, while an example of branched block copolymer is a star block copolymer ((A-B)$_n$-structure). Here, "A" refers to a block of the first polyester (for example, "A" may refer to PET blocks) and "B" refers to blocks of the second polyester (for example, "B" may refer to PETg blocks). Star block copolymers are also referred to as radial or palmtree copolymers, as they have a central point from which branches extend. Other types of block copolymers include combtype polymer structures and other branched copolymers. The block copolyester structure can be determined utilizing known techniques such as those described in *Journal of Polymer Science Part B-Polymer Physics*, Volume 41, 2003, 289-307 by Liu et al., for example.

Figure 2:
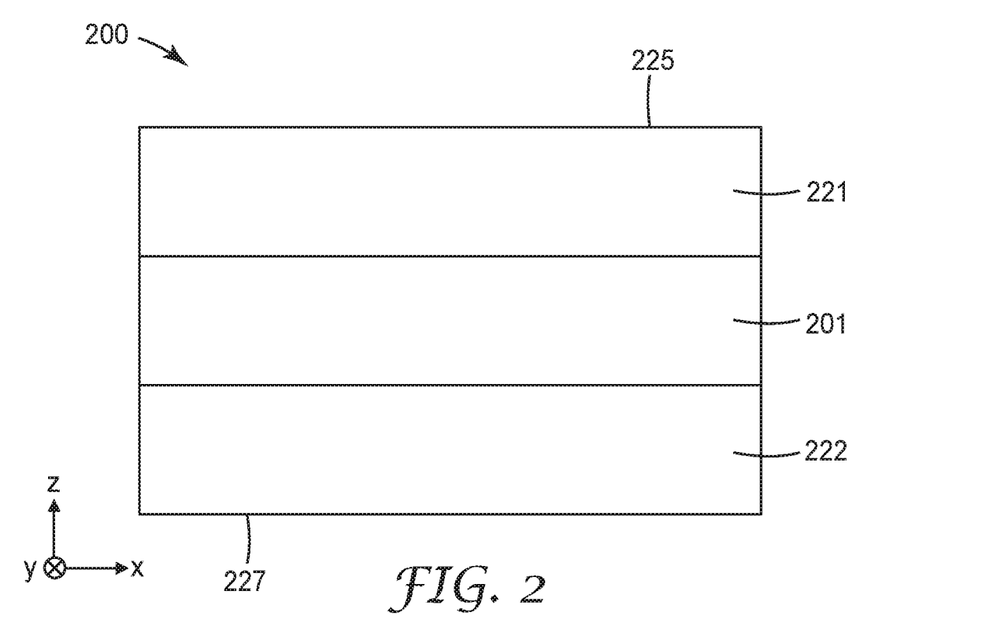
FIG. 2 is a schematic cross-sectional view of another substrate.

FIG. 2 is a schematic cross-sectional view of substrate 200 including polymeric inner layer 201 and first and second outer layers 221 and 222. Each of the first and second outer layers 221 and 222 are heat-set polymeric layers. As used herein, a "heat-set polymeric layer" is a polymeric layer that has physical properties associated with being heat-set at a temperature above the melting point of the layer. For example, heat-set polymeric layers are amorphous and when the layer has a free surface, the surface is optically smooth. In the present description, the term "heat setting" may be applied more broadly to a process in which at least one of the layers in a multilayer stack is heated to a temperature above the melting point of the layer, or, in the case that a layer comprises a block copolymer including first and second polymers, to a process in which the layer is heated above the melting point of at least one of the first and second polymers. In traditional heat-set processes, a layer is typically not heated above the melting point of the layer and the resulting layer is typically not amorphous, typically would not have an optically smooth surface, and would not be characterized, according to the present description, as a "heat-set polymeric layer". The polymeric inner layer 201 is disposed between and in direct contact with the first and second outer layers 221 and 222. The inner layer has a composition differing from that of the first outer layer 221 and differing from that of the second outer layer 222. The first and second outer layers 221 and 222 each have an in-plane birefringence of less than 0.1. The inner layer 201 is substantially uniaxially birefringent and has an in-plane birefringence greater than 0.01. In some embodiments, the inner layer 201, which may correspond to substrate 100, includes a block copolymer comprising a first polyester and second polyester. The first polyester has a melting point greater than 200° C., or greater than 220° C., or greater than 240° C., and the second polyester has a melting point less than 200° C., or less than 190° C., or less than 180° C. The block copolymer includes the second polyester at 40 percent, or 50 percent, or 55 percent to 80 percent, or to 75 percent, or to 70 percent by weight. For example, the block copolymer may include the second polyester at 40 to 80 percent by weight, or at 50 to 80 percent by weight, or at 55 to 75 percent by weight. In some embodiments, the first and second outer layers include a third polyester, which may be the same or different form the second polyester. The third polyester has a melting point less than 200° C., or less than 190° C., or less than 180° C. In some embodiments, the first polyester is polyethylene terephthalate (PET) and the second polyester is glycol modified polyethylene terephthalate (PETg). In some embodiments, the first polyester is polyethylene naphthalate (PEN) and the second polyester is glycol modified polyethylene naphthalate (PENg). Other suitable materials suitable for use as the first and second polyesters include the materials identified as suitable for the first and second polyesters, respectively, for substrate 100. In some embodiments, each of the first and second outer layers 221 and 222 comprise glycol modified polyethylene terephthalate (PETg), glycol modified polyethylene naphthalate (PENg), or one of the other materials suitable for use as the second polyester. In some embodiments, each of the first and second outer layers 221 and 222 include a polyester having a melting point less than 200° C., or less than 190° C., or less than 180° C.

In some embodiments, each of the first and second outer layers 221 and 222 have an in-plane birefringence of less than 0.05, or less than 0.03, or less than 0.01. In some embodiments, each of the first and second outer layers 221 and 222 have an out-of-plane birefringence of less than 0.1, or less than 0.05, or less than 0.03, or less than 0.01. In some embodiments, the inner layer 201 has an in-plane birefringence of greater than 0.02, or greater than 0.03, or greater than 0.05. In some embodiments, the inner layer 201 has an out-of-plane birefringence of greater than 0.01, or greater than 0.03, or greater than 0.05. In some embodiments, the inner layer 201 has an in-plane birefringence and/or an out-of-plane birefringence less than 0.2, or less than 0.15, or less than 0.1. In some embodiments, each of the first and second outer layers 221 and 222 has a lower in-plane birefringence than the inner layer 201. In some embodiments, each of the first and second outer layers 221 and 222 has an in-plane birefringence less than 0.03, or less than 0.02, or less than 0.01, and the inner layer 201 has an in-plane birefringence in a range of 0.05 to 0.2.

In some embodiments, the first outer layer comprises an outermost surface 225 of the substrate 200. The outermost surface 225 may have a surface roughness Ra of less than 100 nm, or less than 50 nm, or less than 20 nm, or even less than 10 nm. In some embodiments, the substrate 200 may include a slip coating disposed on the major surface 227 of the second outer layer 222 opposite the inner layer 201. In some embodiments, a roll of the substrate 200 is provided.

In some embodiments, the substrates of the present description have an elongation at break of at least 40%, or at least 50%, and in some cases up to 350 percent, in each of two orthogonal directions (e.g., MD and TD directions). In some embodiments, the substrates of the present description have an elongation at break of at least 5 times, or at least 7 times, that of COP in each of two orthogonal directions (e.g., MD and TD directions).

In some embodiments, the substrates of the present description have more than 3 layers. For example, the inner layer 201 in FIG. 2 may itself be comprised of a plurality of sublayers. Each of the sublayers may comprise a block copolymer as described elsewhere herein. In some embodiments, at least one of the sublayers is substantially uniaxially birefringent and has an in-plane birefringence greater than 0.01. In some embodiments, each of the sublayers is substantially uniaxially birefringent and has an in-plane birefringence greater than 0.01. If each sublayer is substantially uniaxially birefringent, the inner layer 201 may be described as substantially uniaxially birefringent. If at least one sublayer has an in-plane birefringence greater than 0.01, the inner layer 201 may be described as having an in-plane birefringence greater than 0.01. In some embodiments, at least one of the sublayers comprises a block copolymer comprising a first polyester and second polyester, the first polyester having a melting point greater than 200° C., the second polyester having a melting point less than 200° C., the block copolymer comprising the second polyester at 50 to 80 percent by weight. In some embodiments, a difference in melting point of a first sublayer and a different second sublayer is at least 20° C., or at least 40° C. or at least 60° C. In some embodiments, the difference in the melting point of the first sublayer and the second sublayer is less than 100° C. In some embodiments, inner layer 201 does not comprise a plurality of sublayers, but is instead a single monolithic layer.

Figure 3:
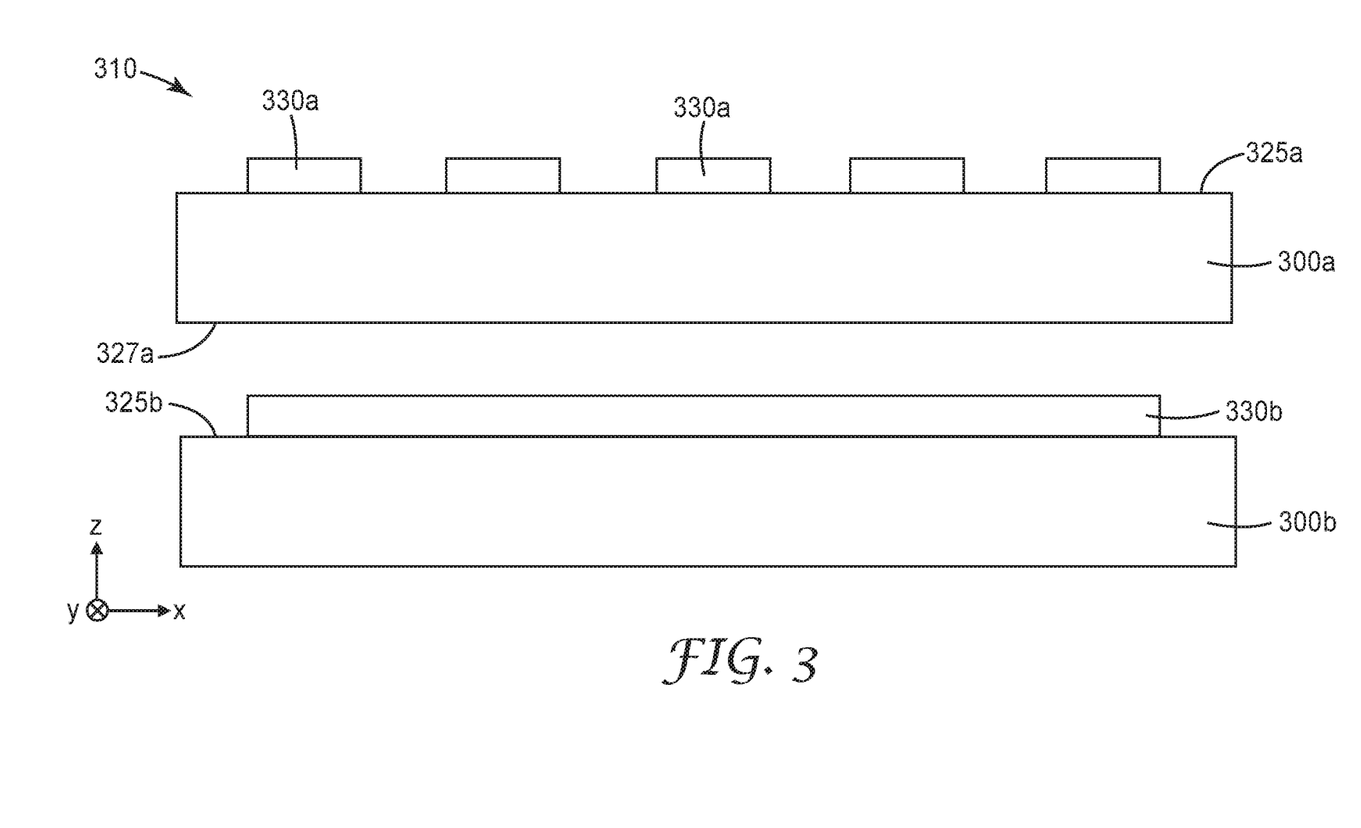
FIG. 3 is a schematic cross-sectional view of a touch sensor.

FIG. 3 is a schematic cross-sectional view of touch sensor 310 including first substrate 300*a* having a first plurality of electrodes 330*a* disposed on a first major surface 325*a* of the first substrate 300*a*. Touch sensor 310 also includes second substrate 300*b* having a second plurality of electrodes 330*b* (only one of the electrodes 330*b* is visible in the cross-section of FIG. 3) disposed on a first major surface 325*b* of the second substrate 300*b*. The first plurality of electrodes 330*a* may extend along a first direction (e.g., the z-direction, referring to the x-y-z coordinate system depicted in FIG. 3) and the second plurality of electrodes 330*b* may extend along an orthogonal second direction (e.g., the x-direction) so that the first and second pluralities of electrodes 330*a* and 330*b* form a crossed grid of electrodes as is conventionally used in touch sensors. In alternative embodiments, the second substrate 300*b* is omitted and the second plurality of electrodes 330*b* are disposed on a second major surface 327*a* of the first substrate 300*a*. First substrate 300*a* may correspond to substrate 100 or substrate 200, for example. Similarly, second substrate 300*b* may correspond to substrate 100 or substrate 200, for example. In some embodiments, both of the first and second substrates 300*a* and 300*b* correspond to one of the substrates 100 or 200, while in other embodiments, only one of the first and second substrates 300*a* and 300*b* corresponds to one of the substrates 100 or 200.

The first and/or second plurality of electrodes may be any type of electrodes suitable for use in touch sensors. Examples include transparent conductor electrodes (e.g., indium tin oxide (ITO)) and metallic mesh electrodes such as those described in U.S. Pat. No. 8,933,906 (Frey) which is hereby incorporated herein by reference to the extent that it does not contradict the present description. Electrodes can be deposited onto a substrate by utilizing sputtering or etching processes as is known in the art. Other useful touch sensors, and methods of making the touch sensors, that can utilize the substrates of the present description are described in U.S. Pat. No. 8,384,961 (Frey et al.), U.S. Pat. No. 8,865,027 (Alden et al.), and U.S. Pat. No. 9,023,229 (Sebastian et al.) and in U.S. Pat. App. No. 2015/316955 (Dodds et al.), each of which are incorporated herein by reference to the extent that it does not contradict the present description.

Figure 4:
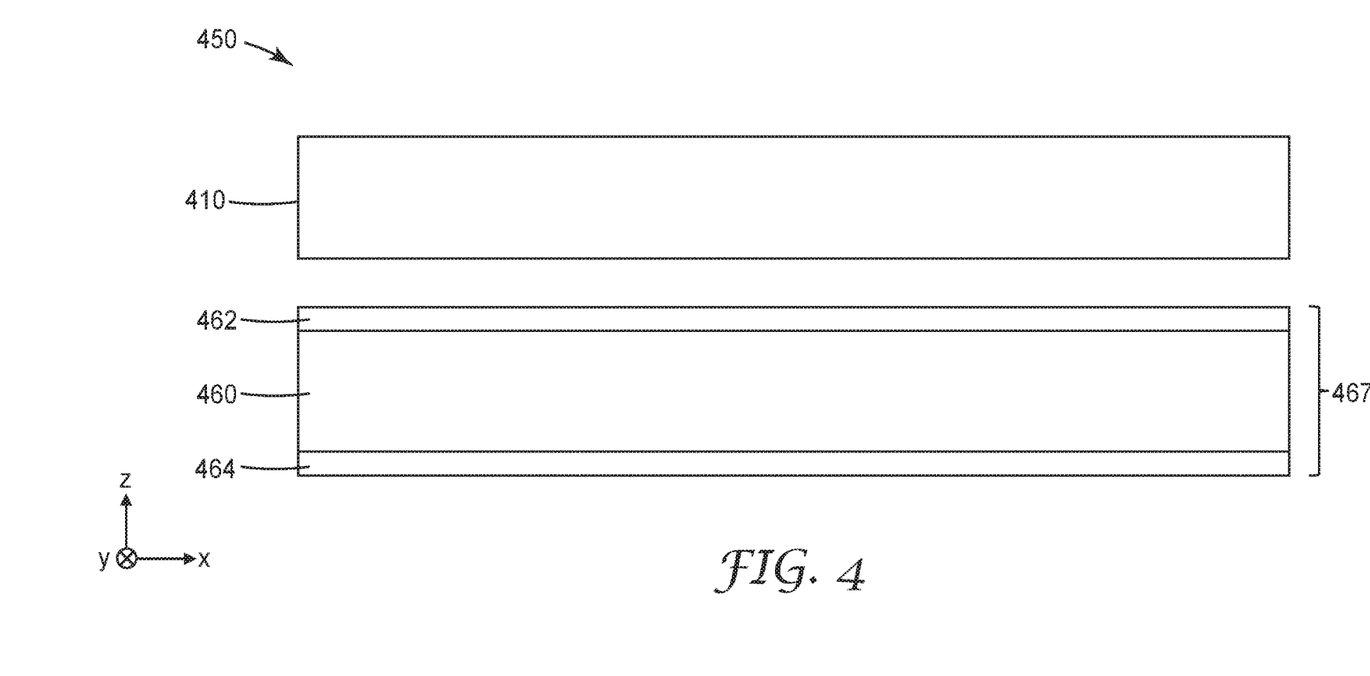
FIG. 4 is a schematic cross-sectional view of a display.

FIG. 4 is a schematic cross-sectional view of a display 450 including a touch sensor 410 and a display panel 467 which includes an active layer 460, which may be a liquid crystal layer, for example, between first and second polarizers 462 and 464. The display panel 467 produces imaged light which propagates in the y-direction through the touch sensor 410 to a viewer. The touch sensor 410 may correspond to touch sensor 310 and may include any of the substrates described elsewhere herein. The first polarizer has a first pass axis (e.g., the x-axis) and the second polarizer has a second pass axis (e.g., the y-axis). The touch sensor 410 includes a substrate that is substantially uniaxially oriented along a first direction or that includes an inner layer that is substantially uniaxially oriented along a first direction. The first direction may be substantially parallel with or substantially perpendicular to the first pass axis. For example, the first pass axis may be along the x-axis and the first direction may be parallel to the x-axis or parallel to the y-axis. Having the first direction substantially parallel or substantially perpendicular to the first pass axis can be advantageous since it can minimize or eliminate spurious color patterns observed by a view of the display 450 who is wearing polarized glasses (e.g., polarized sunglasses).

Figure 5:
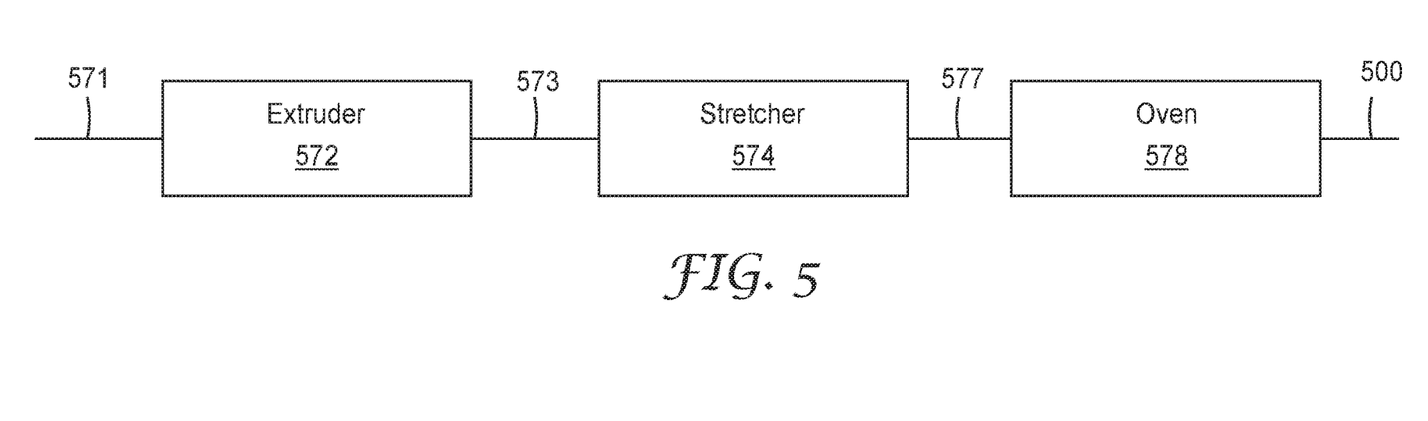
FIG. 5 is a schematic illustration of a system for making a substrate.

FIG. 5 schematically illustrates a system and method of making the substrates of the present description. Materials 571 to be extruded or coextruded are fed into an extruder 572 which produces extruded or coextruded layer(s) 573. Extruded or coextruded layer(s) 573 may be a single layer corresponding to substrate 100 or may include an inner layer and first and second outer layers corresponding to substrate 200. The extruded or coextruded layer(s) 573 are substantially uniaxially stretched in stretcher 574 and then heat set in oven 578 to form the substrate 500. Stretcher 574 is configured to substantially uniaxially stretch the extruded or coextruded layer(s) 573. Substantially uniaxially stretching a film or layers means that the film or layers are stretched predominately in one direction (e.g., in the transverse direction (TD)), but minor stretching in an orthogonal direction (e.g., in the machine direction (MD)) may be acceptable. A film or layer made birefringent via substantially uniaxially stretching may be described as substantially uniaxially birefringent or substantially uniaxially oriented. Stretcher 574 may stretch the extruded or coextruded layer(s) 573 at a first draw ratio in a first direction and at a second draw ratio in an orthogonal second direction. In some embodiments, the stretcher 574 first stretches at the first draw ratio in the first direction and then stretches at the second draw ration in the second direction. In some embodiments, the second draw ratio is much higher than the first draw ratio and in some embodiments, the stretch in the first direction is omitted. When the first draw ratio is substantially smaller than the second draw ratio, the extruded or coextruded layer(s) 573 may be described as being substantially uniaxial oriented at a draw ratio equal to the second draw ratio. The first draw ratio may be described as substantially smaller than the second draw ratio if the stretch produced by second draw ratio (the second draw ratio minus 1 times 100 percent) is at least 4 times, or at least 5 times, or at least 7 times, or at least 10 times the stretch produced by the first draw ratio (the first draw ratio minus 1 times 100 percent). For example, the second draw ratio may be about 4.5, which produces about a 350% stretch, while the first draw ratio may be about 1.2, which produces only about a 20% stretch. The second draw ratio may be at least 2, or at least 2.5, or at least 3, or at least 3.5, or at least 4, and may be less than 7, or less than 6.5, or less than 6, or less than 6.5, or less than 5, or less than 4.8. For example, the second draw ratio may be in a range of 3 to 6, or in a range of 3.5 to 5, or in a range of 4 to 4.8. The first draw ratio is greater than or equal to 1 and may be less than 2, or less than 1.5, or less than 1.3, or less than 1.2, or less than 1.1, or less than 1.05, or may be substantially equal to 1. For example, in some embodiments, the first draw ratio is in a range of 1.0 to 1.5, or in a range of 1.0 to 1.3, or in a range of 1.1 to 1.3. According to the present description, it has been found that utilizing substantially uniaxial orientation improves the stress birefringence uniformity compared to utilizing a biaxial orientation.

Stretcher 574 produces stretched film 577 and oven 578 heat sets the stretched film 577 producing the substrate 500. In embodiments having inner layers and first and second outer layers, the stretched film 577 may be heat set at a temperature that is lower than a melting point of the inner layer, higher than a melting point of the first outer layer, and higher than a melting point of the second outer layer. In embodiments including a block copolymer having first and second polyester blocks, the heat set temperature may be lower than the melting point of the first polyester and higher than the melting point of the second polyester. Subsequent processing steps may include applying a slip coating onto an outermost surface of the substrate 500.

EXAMPLES

Materials

Polyethylene terephthalate (PET) was obtained in pellet form from Nan Ya Plastics Corporation (Taipei, Taiwan) and was designated by the product grade 1N502.

Glycol-modified polyethylene terephthalate polyester (PETg) was obtained from Eastman Chemical Company (Kingsport, Tenn.) and was designated by the product grade EASTAR GN071 Copolyester.

Cyclic Olefin Polymer (COP) was obtained in film form from Zeon Corporation (Tokyo, Japan) and was designated by the product grade of ZEONORFILM ZF-16.

Test Methods

Melting Point ($T_m$) Determination

Melting point was determined by a Q1000 Differential Scanning calorimeter (DSC), commercially available from TA Instruments (New Castle, Del.). The scanning rate was 20° C./min from 23° C. to 300° C.

Stress Birefringence Uniformity Test

Stretched films were tested for their stress birefringence uniformity by placing the film between two absorbing polarizers arranged with their pass direction axes at right angles to each other (often referred to as "crossed polars"). The stretched film was aligned such that its primary optical axis is aligned with one of the polarizer axes. The entire polarizer-film-polarizer stack was placed on a light table of spatially uniform light output. The light that was transmitted through the stack was visually inspected for any non-uniform pattern of color. One of two ratings was assigned by the operator: Poor or Good. "Poor" indicated that a noticeable amount of stress pattern and varying degree of color was observed. "Good" indicated that the transmitted light has good uniformity, and that a negligible amount of stress pattern was observable.

Surface Roughness Test

The surface roughness of films was evaluated using a WYKO micro-interferometer from WYKO (Tucson, Ariz.), a division of Veeco. The roughness average, Ra, (a measure of the arithmetic average deviation of the centerline) was recorded.

Birefringence Determination

The refractive indices or a film in the transverse (x) direction, the machine (y) direction, and the thickness (z) direction were measured using a Prism Coupler from Metricon Corp. (Pennington, N.J.) using light of 633 nm wavelength. The refractive indices of the three directions were recorded as $n_x$, $n_y$, and $n_z$, respectively. The in-plane birefringence, delta($n_x n_y$), was calculated as $n_x - n_y$. The out of plane birefringence was calculated as the difference between the average in-plane refractive index and the refractive index normal to the plane, or, in other words, as $[(n_x+n_y)/2]-n_z$. The in-plane and out-of-plane birefringences of a single-layer stretched film of a polymer are known to be good approximations to the in-plane and out-of-plane birefringences of an individual interior layer, made of the same polymer, of a similarly stretched multilayer film. Thus, the birefringence values for an identically stretched single layer film were determined in lieu of direct measurement of birefringence values for individual interior layers of multilayer constructions.

Comparative Example C1

On a melt extrusion line, two twin screw extruders were used. The two extruders fed a 3-layer feedblock of ABA configuration. The extruder feeding the two skin (A) layers had one resin feeder delivering PETg resin at 28 kg/hr. The other extruder (B) also had one resin feeder, delivering PET at 158 kg/hr into the core layer. The melt line temperature was set at 274 C. and the screw speed was set at 130 rpm for the core extruder and at 50 rpm for skin extruder. The 3 layer melt from the feedblock was fed to a film die and was cast on a chill roll, and the line speed was adjusted to control the cast thickness. The cast film passed through a length orienter and a tenter to undergo a controlled sequential stretching. The draw ratios are 1.2 in machine direction in the length orienter and 4.7 in transverse direction in the tenter. The stretching temperature was set at 95 C. The tenter's heat set temperature was set at 200 C. The overall cast speed was adjusted so that the final film thickness was 100 micrometers.

Comparative Example C2

On a pilot melt extrusion line, two twin screw extruders were used. The two extruders fed a 3-layer feedblock of ABA configuration. The extruder feeding the two skin (A) layers had one resin feeder delivering PETg resin at 1.5 kg/hr. The other extruder (B) also had one resin feeder, delivering PET at 8.5 kg/hr into the core layer. The melt line temperature was set at 274 C. and the screw speed was set at 100 rpm for both extruders. The 3 layer melt from the feedblock was fed to a film die and was cast on a chill roll, and the line speed was adjusted to control the cast thickness. Pieces of the cast film were stretched using a laboratory orienter to undergo a controlled sequential stretching. The draw ratios were 3.5 for machine direction and 3.5 for transverse direction. The stretching temperature was set at 95 C. and stretching rate was 50%/second. Heat setting was done with the temperature set at 200 C. for 30 seconds. The overall cast speed was adjusted so that the final film thickness was 100 micrometers.

Comparative Example C3

On a pilot melt extrusion line, two twin screw extruders were used. The two extruders fed a 3-layer feedblock of ABA configuration. The extruder feeding the two skin (A) layers had one resin feeder delivering PETg resin at 1.5 kg/hr. The other extruder (B) had two resin feeders, one delivering PET and the other delivering PETg, each at a rate of 4.25 kg/hr for a total rate of 8.5 kg/hr into the core layer. The melt line temperature was set at 274 C. and the screw speed was set at 100 rpm for both extruders. PET and PETg are known to react to form a blocky copolymer when extruded together in this manner. The 3 layer melt from the feedblock was fed to a film die and was cast on a chill roll, and the line speed was adjusted to control the cast thickness. Pieces of the cast film were stretched using a laboratory orienter to undergo a controlled sequential stretching. The draw ratios were 3.5 for machine direction and 3.5 for transverse direction. The stretching temperature was set at 95 C and stretching rate was 50%/second. Heat setting was done with the temperature set at 200 C. for 30 seconds. The overall cast speed was adjusted so that the final film thickness was 100 micrometers.

Example 1

On a pilot melt extrusion line, two twin screw extruders were used. The two extruders fed a 3-layer feedblock of ABA configuration. The extruder feeding the two skin (A) layers had one resin feeder delivering PETg resin at 1.5 kg/hr. The other extruder (B) had two resin feeders, one delivering PET and the other delivering PETg, at rates of 6.8 kg/hr and 1.7 kg/hr, respectively, for a total rate of 8.5 kg/hr into the core layer. The melt line temperature was set at 274 C. and the screw speed was set at 100 rpm for both extruders. PET and PETg are known to react to form a blocky copolymer when extruded together in this manner. The 3 layer melt from the feedblock was fed to a film die and was cast on a chill roll, and the line speed was adjusted to control the cast thickness. Pieces of the cast film were stretched using a laboratory orienter to undergo a controlled sequential stretching. The draw ratios were 1.2 for machine direction and 4.7 for transverse direction. The stretching temperature was set at 95 C. and stretching rate was 50%/second. Heat setting was done with the temperature set at 200 C. for 30 seconds. The overall cast speed was adjusted so that the final film thickness was 100 micrometers.

Example 2

On a pilot melt extrusion line, two twin screw extruders were used. The two extruders fed a 3-layer feedblock of ABA configuration. The extruder feeding the two skin (A) layers had one resin feeder delivering PETg resin at 1.5 kg/hr. The other extruder (B) had two resin feeders, one delivering PET and the other delivering PETg, each at a rate of 4.25 kg/hr for a total rate of 8.5 kg/hr into the core layer. The melt line temperature was set at 274 C. and the screw speed was set at 100 rpm for both extruders. PET and PETg are known to react to form a blocky copolymer when extruded together in this manner. The 3 layer melt from the feedblock was fed to a film die and was cast on a chill roll, and the line speed was adjusted to control the cast thickness. Pieces of the cast film were stretched using a laboratory orienter to undergo a controlled sequential stretching. The draw ratios were 1.2 for machine direction and 4.7 for transverse direction. The stretching temperature was set at 95 C. and stretching rate was 50%/second. Heat setting was done with the temperature set at 200 C. for 30 seconds. The overall cast speed was adjusted so that the final film thickness was 100 micrometers.

Example 3

On a melt extrusion line, two twin screw extruders were used. The two extruders fed a 3-layer feedblock of ABA configuration. The extruder feeding the two skin (A) layers had one resin feeder delivering PETg resin at 28 kg/hr. The other extruder (B) had two resin feeders, one delivering PET and the other delivering PETg, at rates of 31.6 kg/hr and 126.4 kg/hr, respectively, for a total rate of 158 kg/hr into the core layer. The melt line temperature was set at 274 C. and the screw speed was set at 130 rpm for the core extruder and at 50 rpm for skin extruder. PET and PETg are known to react to form a blocky copolymer when extruded together in this manner. The 3 layer melt from the feedblock was fed to a film die and was cast on a chill roll, and the line speed was adjusted to control the cast thickness. The cast film passed through a length orienter and a tenter to undergo a controlled sequential stretching. The draw ratios are 1.2 in machine direction in the length orienter and 4.7 in transverse direction in the tenter. The stretching temperature was set at 95 C. The tenter's heat set temperature was set at 200 C. The overall cast speed was adjusted so that the final film thickness was 100 micrometers.

Comparative Example C4

On a melt extrusion line, two twin screw extruders were used. The two extruders fed a 3-layer feedblock of ABA configuration. The extruder feeding the two skin (A) layers had one resin feeder delivering PETg resin at 28 kg/hr. The other extruder (B) also had one resin feeder, also delivering PETg, but at 158 kg/hr into the core layer. The melt line temperature was set at 274 C. and the screw speed was set at 130 rpm for the core extruder and at 50 rpm for skin extruder. The 3 layer melt from the feedblock was fed to a film die and was cast on a chill roll, and the line speed was adjusted to control the cast thickness. The cast film passed through a length orienter and a tenter to undergo a controlled sequential stretching. The draw ratios are 1.2 in machine direction in the length orienter and 4.7 in transverse direction in the tenter. The stretching temperature was set at 95 C. The tenter's heat set temperature was set at 200 C. The overall cast speed was adjusted so that the final film thickness was 100 micrometers.

The constructions of the preceding Examples and Comparative Examples are summarized in Table 1. Each film was tested for Stress Birefringence Uniformity, Surface Roughness, and In-Plane and Out-of-Plane Birefringences (of both the core layer and the skin layers), and the general film flatness was qualitatively assessed. The results are shown in Table 2.

TABLE 1

3-Layer Constructions

| Ex. | Skin Layer 1 | Core Layer | Skin Layer 2 | Melt. Point (C.) Skin Outer 1 | Melting Point (C.) Core Inner Layer Polymer Block 1 | Melting Point (C.) Core Inner Layer Polymer Block 2 | Melt. Point (C.) Skin Outer 2 | Heat Set Temp (C.) | Draw Ratio |
|---|---|---|---|---|---|---|---|---|---|
| C1 | PETg | PET(100) | PETg | 165 | 250 | 250 | 165 | 200 | 1.2 × 4.7 |
| C2 | PETg | PET(100) | PETg | 165 | 250 | 250 | 165 | 200 | 3.5 × 3.5 |
| C3 | PETg | PET-PETg Block Copoly. (50/50) | PETg | 165 | 165 | 250 | 165 | 200 | 3.5 × 3.5 |
| 1 | PETg | PET-PETg Block Copoly. (80/20) | PETg | 165 | 165 | 250 | 165 | 200 | 1.2 × 4.7 |
| 2 | PETg | PET-PETg Block Copoly. (50/50) | PETg | 165 | 165 | 250 | 165 | 200 | 1.2 × 4.7 |
| 3 | PETg | PET-PETg Block Copoly. (20/80) | PETg | 165 | 165 | 250 | 165 | 200 | 1.2 × 4.7 |
| C4 | PETg | PETg (100) | PETg | 165 | 165 | 165 | 165 | 200 | 1.2 × 4.7 |

TABLE 2

Results for 3-Layer Constructions

| Example | Stress Birefring. Uniformity | Surface Roughness (Ra) | In-Plane Birefringence Core/Inner Layer | Out-of-Plane Birefringence Core/Inner Layer | In-Plane Birefringence Skin/Outer Layer | Out-of-Plane Birefringence Skin/Outer Layer | Film Flatness |
|---|---|---|---|---|---|---|---|
| C1 | Poor | <20 nm | 0.12 | 0.13 | 0.001 | 0.001 | Good |
| C2 | Poor | <20 nm | 0.00 | 0.16 | 0.001 | 0.001 | Good |
| C3 | Poor | <20 nm | 0.00 | 0.09 | 0.001 | 0.001 | Good |
| 1 | Good | <20 nm | 0.09 | 0.11 | 0.001 | 0.001 | Good |
| 2 | Good | <20 nm | 0.09 | 0.09 | 0.001 | 0.001 | Good |
| 3 | Good | <20 nm | 0.08 | 0.07 | 0.001 | 0.001 | Good |
| C4 | Poor | <20 nm | 0.00 | 0.00 | 0.00 | 0.00 | Poor |

Comparative Example C5

On a melt extrusion line, a twin screw extruders was used with one resin feeder delivering PET resin at 150 kg/hr. The melt line temperature was set at 274 C. and the extruder screw speed was set at 130 rpm. The melt from the extruder was fed to a film die and was cast on a chill roll, and the line speed was adjusted to control the cast thickness. The cast film passed through a length orienter and a tenter to undergo a controlled sequential stretching. The draw ratios are 1.2 in machine direction in the length orienter and 4.7 in transverse direction in the tenter. The stretching temperature was set at 95 C. The tenter's heat set temperature was set at 200 C. The overall cast speed was adjusted so that the final film thickness was 100 micrometers.

Comparative Example C6

On a melt extrusion line, a twin screw extruders was used with one resin feeder delivering PET resin at 150 kg/hr. The melt line temperature was set at 274 C. and the extruder screw speed was set at 130 rpm. The melt from the extruder was fed to a film die and was cast on a chill roll, and the line speed was adjusted to control the cast thickness. The cast film passed through a length orienter and a tenter to undergo a controlled sequential stretching. The draw ratios are 3.5 in machine direction in the length orienter and 3.5 in transverse direction in the tenter. The stretching temperature was set at 95 C. The tenter's heat set temperature was set at 200 C. The overall cast speed was adjusted so that the final film thickness was 100 micrometers.

Comparative Example C7

On a pilot melt extrusion line, a twin screw extruders was used with two resin feeders, one delivering PET resin at 5 kg/hr and the other delivering PETg resin at 5 kg/hr. The melt line temperature was set at 274 C. and the extruder screw speed was set at 50 rpm. PET and PETg are known to react to form a blocky copolymer when extruded together in this manner. The melt from the extruder was fed to a film die and was cast on a chill roll, and the line speed was adjusted to control the cast thickness. Pieces of the cast film were stretched using a laboratory orienter to undergo a controlled sequential stretching. The draw ratios were 3.5 for machine direction and 3.5 for transverse direction. The stretching temperature was set at 95 C. and stretching rate was 50%/second. Heat setting was done with the temperature set at 200 C. for 30 seconds. The overall cast speed was adjusted so that the final film thickness was 100 micrometers.

Example 4

On a pilot melt extrusion line, a twin screw extruders was used with two resin feeders, one delivering PET resin at 8 kg/hr and the other delivering PETg resin at 2 kg/hr. The melt line temperature was set at 274 C. and the extruder screw speed was set at 50 rpm. PET and PETg are known to react to form a blocky copolymer when extruded together in this manner. The melt from the extruder was fed to a film die and was cast on a chill roll, and the line speed was adjusted to control the cast thickness. Pieces of the cast film were stretched using a laboratory orienter to undergo a controlled sequential stretching. The draw ratios were 1.2 for machine direction and 4.7 for transverse direction. The stretching temperature was set at 95 C. and stretching rate was 50%/second. Heat setting was done with the temperature set at 200 C. for 30 seconds. The overall cast speed was adjusted so that the final film thickness was 100 micrometers.

Example 5

On a pilot melt extrusion line, a twin screw extruders was used with two resin feeders, one delivering PET resin at 5 kg/hr and the other delivering PETg resin at 5 kg/hr. The melt line temperature was set at 274 C. and the extruder screw speed was set at 50 rpm. PET and PETg are known to react to form a blocky copolymer when extruded together in this manner. The melt from the extruder was fed to a film die and was cast on a chill roll, and the line speed was adjusted to control the cast thickness. Pieces of the cast film were stretched using a laboratory orienter to undergo a controlled sequential stretching. The draw ratios were 1.2 for machine direction and 4.7 for transverse direction. The stretching temperature was set at 95 C. and stretching rate was 50%/second. Heat setting was done with the temperature set at 200 C. for 30 seconds. The overall cast speed was adjusted so that the final film thickness was 100 micrometers.

Example 6

On a melt extrusion line, a twin screw extruders was used with two resin feeders, one delivering PET resin at 30 kg/hr and the other delivering PETg resin at 120 kg/hr. The melt line temperature was set at 274 C. and the extruder screw speed was set at 130 rpm. PET and PETg are known to react to form a blocky copolymer when extruded together in this manner. The melt from the extruder was fed to a film die and was cast on a chill roll, and the line speed was adjusted to control the cast thickness. The cast film passed through a length orienter and a tenter to undergo a controlled sequential stretching. The draw ratios are 1.2 in machine direction in the length orienter and 4.7 in transverse direction in the tenter. The stretching temperature was set at 95 C. The tenter's heat set temperature was set at 200 C. The overall cast speed was adjusted so that the final film thickness was 100 micrometers.

Comparative Example C8

On a pilot melt extrusion line, a twin screw extruders was used with one resin feeder delivering PETg resin at 8 kg/hr. The melt line temperature was set at 274 C. and the extruder screw speed was set at 50 rpm. The melt from the extruder was fed to a film die and was cast on a chill roll, and the line speed was adjusted to control the cast thickness. Pieces of the cast film were stretched using a laboratory orienter to undergo a controlled sequential stretching. The draw ratios were 1.2 for machine direction and 4.7 for transverse direction. The stretching temperature was set at 95 C. and stretching rate was 50%/second. Heat setting was done with the temperature set at 200 C. for 30 seconds. The overall cast speed was adjusted so that the final film thickness was 100 micrometers.

The films of the immediately preceding Examples and Comparative Examples were tested for Stress Birefringence Uniformity, Surface Roughness, and In-Plane and Out-of-Plane Birefringences, and the general film flatness was qualitatively assessed. The film constructions and the test results are shown in Table 3.

TABLE 3

Single-Layer Constructions and Results

| Ex. | Single Layer Comp. | Poly. Bl. 1 Melt. Point (C.) | Poly. Bl. 2 Melt. Point (C.) | Heat Set Temp (C.) | Draw Ratio | Stress Birefringence Uniform. | Surface Roughness (Ra) | In-Plane Birefringence | Out-of-Plane Birefringence | Film Flat. Qual. |
|---|---|---|---|---|---|---|---|---|---|---|
| C5 | PET (100) | 250 | 250 | 200 | 1.2 × 4.7 | Poor | <20 nm | 0.12 | 0.13 | Good |
| C6 | PET (100) | 250 | 250 | 200 | 3.5 × 3.5 | Poor | <20 nm | 0.00 | 0.16 | Good |
| C7 | PET - PETg Block Copoly. (50/50) | 165 | 250 | 200 | 3.5 × 3.5 | Poor | <20 nm | 0.00 | 0.09 | Good |
| 4 | PET - PETg Block Copoly. (80/20) | 165 | 250 | 200 | 1.2 × 4.7 | Good | <20 nm | 0.09 | 0.11 | Good |
| 5 | PET - PETg Block Copoly. (50/50) | 165 | 250 | 200 | 1.2 × 4.7 | Good | <20 nm | 0.09 | 0.09 | Good |
| 6 | PET - PETg Block Copoly. (20/80) | 165 | 250 | 200 | 1.2 × 4.7 | Good | <20 nm | 0.08 | 0.07 | Good |
| C8 | PETg (100) | 165 | 165 | 200 | 1.2 × 4.7 | Poor | <20 nm | 0.00 | 0.00 | Good |

Example 7

The film of Example 3 was subsequently coated with an electrode layer typically used for touch sensor manufacture.

Comparative Example C9

Comparative example C9 is a COP film, ZEONORFILM ZF-16, from Zeon Corporation, intended for use in touch sensor manufacture, and was tested as received.

Comparative Example C10

The COP film of Comparative Example C9 was coated in the same way, and with the same electrode layer typically used for touch sensor manufacture, as was the film of Example 3 in Example 7.

Specimens of each of the films of Examples C9, 3, C10, and 7 were cut in the MD and TD directions, and tensile tested, identically, by standard techniques familiar in the art. The Break Elongation was recorded, and the results are shown in Table 4.

TABLE 4

Break Elongations for Example Film and Coated Film and of a Comparative Film and Coated Film

| Example | Electrode Coating | Break Elongation MD (%) | Break Elongation TD (%) |
|---|---|---|---|
| C9 | No | 5% | 3% |
| 3 | No | 325% | 75% |
| C10 | Yes | 5% | 2% |
| 7 | Yes | 100% | 80% |

The following is a list of exemplary embodiments of the present description.

Embodiment 1 is a substrate comprising:
first and second outer layers, each of the first and second outer layers being heat-set polymeric layers; and a polymeric inner layer disposed between and in direct contact with the first and second outer layers, the inner layer having a composition differing from that of the first outer layer and differing from that of the second outer layer; wherein the first and second outer layers each have an in-plane birefringence of less than 0.1 and the inner layer is substantially uniaxially birefringent and has an in-plane birefringence greater than 0.01.

Embodiment 2 is the substrate of Embodiment 1, wherein the inner layer comprises a block copolymer comprising a first polyester and a second polyester, the first polyester having a melting point greater than 200° C., the second polyester having a melting point less than 200° C., the block copolymer comprising the second polyester at 50 to 80 percent by weight.

Embodiment 3 is the substrate of Embodiment 2, wherein the melting point of the first polyester is greater than 220° C. and the melting point of the second polyester is less than 190° C.

Embodiment 4 is the substrate of Embodiment 2, wherein the melting point of the first polyester is greater than 240° C. and the melting point of the second polyester is less than 180° C.

Embodiment 5 is the substrate of Embodiment 2, wherein each of the first and second outer layers comprise a third polyester having a melting point less than 200° C.

Embodiment 6 is the substrate of Embodiment 5, wherein the third polyester is the same as the second polyester.

Embodiment 7 is the substrate of Embodiment 5, wherein the melting point of the third polyester is less than 190° C.

Embodiment 8 is the substrate of Embodiment 5, wherein the melting point of the third polyester is less than 180° C.

Embodiment 9 is the substrate of Embodiment 2, wherein the first polyester is polyethylene terephthalate (PET) and the second polyester is glycol modified polyethylene terephthalate (PETg).

Embodiment 10 is the substrate of Embodiment 9, wherein each of the first and second outer layers comprise glycol modified polyethylene terephthalate (PETg).

Embodiment 11 is the substrate of Embodiment 2, wherein the first polyester is polyethylene naphthalate (PEN) and the second polyester is glycol modified polyethylene naphthalate (PENg).

Embodiment 12 is the substrate of Embodiment 11, wherein each of the first and second outer layers comprise glycol modified polyethylene naphthalate (PENg).

Embodiment 13 is the substrate of Embodiment 1, wherein each of the first and second outer layers comprise a polyester having a melting point less than 200° C.

Embodiment 14 is the substrate of Embodiment 1, wherein each of the first and second outer layers have an in-plane birefringence of less than 0.05.

Embodiment 15 is the substrate of Embodiment 1, wherein each of the first and second outer layers have an in-plane birefringence of less than 0.03.

Embodiment 16 is the substrate of Embodiment 1, wherein each of the first and second outer layers have an in-plane birefringence of less than 0.01.

Embodiment 17 is the substrate of Embodiment 1, wherein each of the first and second outer layers have an out-of-plane birefringence of less than 0.1.

Embodiment 18 is the substrate of Embodiment 1, wherein each of the first and second outer layers have an out-of-plane birefringence of less than 0.05.

Embodiment 19 is the substrate of Embodiment 1, wherein each of the first and second outer layers have an out-of-plane birefringence of less than 0.03.

Embodiment 20 is the substrate of Embodiment 1, wherein each of the first and second outer layers have an out-of-plane birefringence of less than 0.01.

Embodiment 21 is the substrate of Embodiment 1, wherein the inner layer has an in-plane birefringence of greater than 0.02.

Embodiment 22 is the substrate of Embodiment 1, wherein the inner layer has an in-plane birefringence of greater than 0.03.

Embodiment 23 is the substrate of Embodiment 1, wherein the inner layer has an in-plane birefringence of greater than 0.05.

Embodiment 24 is the substrate of Embodiment 1, wherein the inner layer has an out-of-plane birefringence of greater than 0.01.

Embodiment 25 is the substrate of Embodiment 1, wherein the inner layer has an out-of-plane birefringence of greater than 0.03.

Embodiment 26 is the substrate of Embodiment 1, wherein the inner layer has an out-of-plane birefringence of greater than 0.05.

Embodiment 27 is the substrate of Embodiment 1, wherein the inner layer has an in-plane birefringence less than 0.2.

Embodiment 28 is the substrate of Embodiment 1, wherein each of the first and second outer layers has a lower in-plane birefringence than the inner layer.

Embodiment 29 is the substrate of Embodiment 1, wherein each of the first and second outer layers has an in-plane birefringence less than 0.03 and the inner layer has an in-plane birefringence in a range of 0.05 to 0.2.

Embodiment 30 is the substrate of Embodiment 1, wherein the first outer layer comprises an outermost surface of the substrate, the outermost surface having a surface roughness Ra of less than 100 nm.

Embodiment 31 is the substrate of Embodiment 30, wherein the surface roughness Ra is less than 50 nm.

Embodiment 32 is the substrate of Embodiment 30, wherein the surface roughness Ra is less than 20 nm.

Embodiment 33 is the substrate of Embodiment 1, further comprising a slip coating disposed on the second outer layer opposite the inner layer.

Embodiment 34 is the substrate of Embodiment 1, wherein the inner layer comprises a plurality of sublayers.

Embodiment 35 is the substrate of Embodiment 34, wherein a first sublayer in the plurality of sublayers has a melting point differing from that of a second sublayer in the plurality of sublayers by at least 20° C.

Embodiment 36 is a display comprising:
a polarizer having a pass axis; and
a touch sensor comprising the substrate of Embodiment 1, the touch sensor disposed proximate the polarizer,
wherein the inner polymeric layer is substantially uniaxially oriented along a direction substantially parallel with or substantially perpendicular to the pass axis.

Embodiment 37 is the display of Embodiment 36, wherein a liquid crystal display panel comprises the polarizer.

Embodiment 38 is the display of Embodiment 36, wherein the touch sensor comprises a plurality of electrodes disposed on a surface of the substrate.

Embodiment 39 is a touch sensor comprising:
the substrate of Embodiment 1, and
a plurality of electrodes disposed on a surface of the substrate.

Embodiment 40 is a method of making the substrate of Embodiment 1, the method comprising:
coextruding the first and second outer layers and the inner layer forming coextruded layers;
substantially uniaxially stretching the coextruded layers;
heat setting the coextruded layers to form the substrate.

Embodiment 41 is the method of Embodiment 40, wherein the substantially uniaxially stretching the coextruded layers step comprises stretching the coextruded layers at a draw ratio in a range of 3 to 6.

Embodiment 42 is the method of Embodiment 41, wherein the draw ratio is in a range of 3.5 to 5.0.

Embodiment 43 is the method of Embodiment 42, wherein the draw ratio is in a range of 4.0 to 4.8.

Embodiment 44 is the method of Embodiment 40, wherein the heat setting step comprises heating the coextruded layers to a temperature that is lower than a melting point of the inner layer, higher than a melting point of the first outer layer, and higher than a melting point of the second outer layer.

Embodiment 45 is the method of Embodiment 40, further comprising the step of applying a slip coating onto an outermost surface of the second outer layer.

Embodiment 46 is a substrate comprising:
a block copolymer comprising a first polyester and second polyester, the first polyester having a melting point greater than 200° C., the second polyester having a melting point less than 200° C., the block copolymer comprising the second polyester at 50 to 80 percent by weight,
wherein the substrate is substantially uniaxially birefringent and has an in-plane birefringence between 0.001 and 0.1.

Embodiment 47 is the substrate of Embodiment 46, wherein the melting point of the first polyester is greater than 220° C. and the melting point of the second polyester is less than 190° C.

Embodiment 48 is the substrate of Embodiment 46, wherein the melting point of the first polyester is greater than 240° C. and the melting point of the second polyester is less than 180° C.

Embodiment 49 is the substrate of Embodiment 46, wherein the in-plane birefringence is greater than 0.005.

Embodiment 50 is the substrate of Embodiment 46, wherein the in-plane birefringence is greater than 0.01.

Embodiment 51 is the substrate of Embodiment 46, wherein the in-plane birefringence is less than 0.05.

Embodiment 52 is the substrate of Embodiment 46, wherein the substrate has opposing outermost first and second major surfaces, the first major surface having a surface roughness Ra of less than 100 nm.

Embodiment 53 is the substrate of Embodiment 52, wherein the surface roughness Ra is less than 50 nm.

Embodiment 54 is the substrate of Embodiment 52, wherein the surface roughness Ra is less than 20 nm.

Embodiment 55 is the substrate of Embodiment 52, further comprising a slip coating disposed on the second major surface.

Embodiment 56 is a display comprising:
a polarizer having a pass axis; and
a touch sensor comprising the substrate of Embodiment 46, the touch sensor disposed proximate the polarizer,
wherein the substrate is substantially uniaxially oriented along a direction substantially parallel with or substantially perpendicular to the pass axis.

Embodiment 57 is the display of Embodiment 56, wherein a liquid crystal display panel comprises the polarizer.

Embodiment 58 is the display of Embodiment 56, wherein the touch sensor comprises a plurality of electrodes disposed on a surface of the substrate.

Embodiment 59 is a touch sensor comprising:
the substrate of Embodiment 46, and
a plurality of electrodes disposed on a surface of the substrate.

Embodiment 60 is a method of making the substrate of Embodiment 46, the method comprising: extruding a layer;
substantially uniaxially stretching the extruded layer;
heat setting the extruded layer to form the substrate.

Embodiment 61 is the method of Embodiment 60, wherein the substantially uniaxially stretching the extruded layer step comprises stretching the extruded layer at a draw ratio in a range of 3 to 6.

Embodiment 62 is the method of Embodiment 61, wherein the draw ratio is in a range of 3.5 to 5.0.

Embodiment 63 is the method of Embodiment 62, wherein the draw ratio is in a range of 4.0 to 4.8.

Embodiment 64 is the method of Embodiment 60, wherein the heat setting step comprises heating the extruded layer to a temperature that is lower than the melting point of the first polyester and higher than the melting point of the second polyester.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A substrate comprising:
first and second outer layers, each of the first and second outer layers being heat-set polymeric layers; and a polymeric inner layer disposed between and in direct contact with the first and second outer layers, the inner layer having a composition differing from that of the first outer layer and differing from that of the second outer layer;

wherein the first and second outer layers each have an in-plane birefringence of less than 0.1 and the inner layer is substantially uniaxially birefringent and has an in-plane birefringence greater than 0.01, and wherein the inner layer comprises a block copolymer comprising a first polyester and a second polyester, the first polyester having a melting point greater than 200° C., the second polyester having a melting point less than 200° C., the block copolymer comprising the second polyester at 50 to 80 percent by weight.

2. The substrate of claim 1, wherein each of the first and second outer layers comprise a third polyester having a melting point less than 200° C.

3. The substrate of claim 1, wherein the first polyester is polyethylene terephthalate (PET) and the second polyester is glycol modified polyethylene terephthalate (PETg), and wherein each of the first and second outer layers comprise glycol modified polyethylene terephthalate (PETg).

4. The substrate of claim 1, wherein the first polyester is polyethylene naphthalate (PEN) and the second polyester is glycol modified polyethylene naphthalate (PENg), and wherein each of the first and second outer layers comprise glycol modified polyethylene naphthalate (PENg).

5. The substrate of claim 1, wherein each of the first and second outer layers have an in-plane birefringence of less than 0.01.

6. The substrate of claim 1, wherein each of the first and second outer layers have an out-of-plane birefringence of less than 0.01.

7. The substrate of claim 1, wherein the inner layer has an in-plane birefringence of greater than 0.05.

8. The substrate of claim 1, wherein the inner layer has an out-of-plane birefringence of greater than 0.05.

9. The substrate of claim 1, wherein the first outer layer comprises an outermost surface of the substrate, the outermost surface having a surface roughness Ra of less than 100 nm.

10. A display comprising:
a polarizer having a pass axis; and
a touch sensor comprising the substrate of claim 1, the touch sensor disposed proximate the polarizer,
wherein the inner layer is substantially uniaxially oriented along a direction substantially parallel with or substantially perpendicular to the pass axis.

11. A touch sensor comprising:
the substrate of claim 1, and
a plurality of electrodes disposed on a surface of the substrate.

12. A method of making the substrate of claim 1, the method comprising:
coextruding the first and second outer layers and the inner layer forming coextruded layers;
substantially uniaxially stretching the coextruded layers;
heat setting the coextruded layers to form the substrate.

13. The method of claim 12, wherein the substantially uniaxially stretching the coextruded layers step comprises stretching the coextruded layers at a draw ratio in a range of 3 to 6.

14. The method of claim 12, wherein the heat setting step comprises heating the coextruded layers to a temperature that is lower than a melting point of the inner layer, higher than a melting point of the first outer layer, and higher than a melting point of the second outer layer.

15. A substrate comprising:
a block copolymer comprising a first polyester and second polyester, the first polyester having a melting point greater than 200° C., the second polyester having a melting point less than 200° C., the block copolymer comprising the second polyester at 50 to 80 percent by weight,
wherein the substrate is substantially uniaxially birefringent and has an in-plane birefringence between 0.001 and 0.1.

16. A display comprising:
a polarizer having a pass axis; and
a touch sensor comprising the substrate of claim 15, the touch sensor disposed proximate the polarizer,
wherein the substrate is substantially uniaxially oriented along a direction substantially parallel with or substantially perpendicular to the pass axis.

17. A touch sensor comprising:
the substrate of claim 15, and
a plurality of electrodes disposed on a surface of the substrate.

18. A method of making the substrate of claim 15, the method comprising:
extruding a layer;
substantially uniaxially stretching the extruded layer;
heat setting the extruded layer to form the substrate.

19. The method of claim 18, wherein the heat setting step comprises heating the extruded layer to a temperature that is lower than the melting point of the first polyester and higher than the melting point of the second polyester.

* * * * *

UNITED STATES PATENT AND TRADEMARK OFFICE
CERTIFICATE OF CORRECTION

PATENT NO. : 10,747,040 B2  
APPLICATION NO. : 16/099600  
DATED : August 18, 2020  
INVENTOR(S) : Richard Liu Page 1 of 1

It is certified that error appears in the above-identified patent and that said Letters Patent is hereby corrected as shown below:

On the Title Page

Item (73) (Assignee)  
Line 1, Delete "Innovation" and insert -- Innovative --, therefor.

In the Specification

Column 7  
Line 53, Delete "calorimeter" and insert -- Calorimeter --, therefor.

Column 8  
Line 18, Delete "delta($n_x n_y$)," and insert -- delta ($n_{xy}$), --, therefor.

Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*